US 6,704,849 B2

(12) United States Patent
Steegmans

(10) Patent No.: US 6,704,849 B2
(45) Date of Patent: Mar. 9, 2004

(54) PROCESS, DATA PROCESSING DEVICE, SERVICE PROVISION SERVER, BACK-UP SERVER AND PROGRAM MODULES FOR BACKING-UP DATA

(75) Inventor: Frank Steegmans, San Jose, CA (US)

(73) Assignee: Alcatel, Paris (FR)

( * ) Notice: Subject to any disclaimer, the term of this patent is extended or adjusted under 35 U.S.C. 154(b) by 131 days.

(21) Appl. No.: 09/801,694

(22) Filed: Mar. 9, 2001

(65) Prior Publication Data

US 2001/0037474 A1 Nov. 1, 2001

(30) Foreign Application Priority Data

Mar. 10, 2000 (EP) .............................. 00440069

(51) Int. Cl.⁷ .............................................. G06F 12/16
(52) U.S. Cl. ................... 711/162; 711/114; 711/116; 709/217; 709/218; 714/5; 714/6
(58) Field of Search ................ 709/217, 218; 711/114, 161, 162; 714/5, 6

(56) References Cited

U.S. PATENT DOCUMENTS

| 5,210,866 A | * | 5/1993 | Milligan et al. ............... 714/6 |
| 5,819,020 A | * | 10/1998 | Beeler, Jr. .................... 707/204 |
| 6,065,046 A | * | 5/2000 | Feinberg et al. ............. 709/216 |
| 6,363,462 B1 | * | 3/2002 | Bergsten ..................... 711/162 |
| 6,397,307 B2 | * | 5/2002 | Ohran ......................... 380/280 |
| 6,411,991 B1 | * | 6/2002 | Helmer et al. ............... 707/202 |

FOREIGN PATENT DOCUMENTS

| EP | 0 774 715 A | * | 5/1997 | ........... G06F/11/14 |
| EP | 0774 715 A | * | 5/1997 | ........... G06F/11/14 |

* cited by examiner

Primary Examiner—T Ngugyen
(74) Attorney, Agent, or Firm—Sughrue Mion, PLLC

(57) ABSTRACT

The present invention relates to a process for backing-up data stored on storage means (MEMA1, MEMA2, MEMA3) of a data processing device (TERA). The invention further relates to a data processing device (TERA), a service provision server (SM), a back-up server (BA1) and a respective program module for a data processing device, for a service provision server and for a back-up server for the backing-up of data. Following the determination of the data in the storage means (MEMA1, MEMA2, MEAM3) which are to be backed-up, a first connection (VA, VBA1) between the data processing device (TERA) and a first back-up server (BA1) spatially remote from the data processing device (TERA) and at least one second connection (VA, VBA2) between the data processing device (TERA) and at least one second back-up server (BA2) spatially remote from the data processing device (TERA) are established via a telecommunications network (NET). From the data to be backed-up, a first and at least one second data stream (DSBA1, DSBA2) are formed and transmitted from the data processing device (TERA) to the first and the at least one second back-up server (BA1, BA2).

21 Claims, 4 Drawing Sheets

PROCESS, DATA PROCESSING DEVICE, SERVICE PROVISION SERVER, BACK-UP SERVER AND PROGRAM MODULES FOR BACKING-UP DATA

BACKGROUND OF THE INVENTION

The present invention relates to a process for backing up data according to the preamble of Claim 1, a data processing device according to the preamble of Claim 11 therefor, a service provision server according to the preamble of Claim 13 therefor, a back-up server according to the preamble of Claim 16 therefor, and a respective program module for a data processing device, for a service provision server and for a back-up server according to the preambles of Claims 12, 15 and 17 therefor.

In known so-called back-up processes for backing-up data of a data processing device, for example a personal computer or also a computing center comprising a plurality of networked computers, firstly the data to be backed-up stored on the storage means of the data processing device are determined, for example with the aid of a configuration file created by a user, and are then stored on a storage medium of large storage capacity. So-called streamers, which store the data to be backed-up on a magnetic tape, are normally used for this purpose. For the backing-up of very important data, in each back-up process the same data can be recorded on a plurality of magnetic tapes which are preferably kept at different locations geographically remote from one another for protection from destruction by environmental influences, for example fire or water. However, this procedure is inconvenient and complicated, so that the magnetic tapes are often stored only at one location, for example in a safe, and the risk of data loss is very high.

SUMMARY OF THE INVENTION

Therefore the object of the invention is to back-up data of a data processing device in a reliable and convenient manner.

This object is achieved by a process for backing-up data according to the technical theory of claim 1, a data processing device according to the technical theory of claim 11 therefor, a service provision server according to the technical theory of claim 13 therefor, a back-up server according to the technical theory of claim 16 therefor, and a respective program module for a data processing device, for a service provision server and for a back-up server according to the preambles of claims 12, 15 and 17.

The invention is based on the principle of storing data to be backed-up of a data processing device on different back-up servers which are spatially remote from one another, and transmitting the data to the relevant back-up servers via a telecommunications network, for example a broadband data network. Such back-up servers are then advantageously situated in particularly protected locations, for example military bunkers or the like. Thus the invention does not involve the complicated handling of different storage media which a user must arrange at different locations, but instead employs easily handled communications services. Additionally, due to the redundant distribution of the data to be backed-up between different, spatially remote back-up servers, data loss becomes very unlikely.

Further advantageous effects of the invention will be disclosed in the dependent claims and the description.

For protection against undesired access on the transmission path through the telecommunications network, the data in each case to be backed-up are not transmitted in full to all of the back-up servers, but in each case only sub-quantities of the data to be backed-up are transmitted to the back-up servers, said sub-quantities being complementary to one another. Only when the complementary sub-quantities of the backed-up data are recombined, can the original data be recovered. On the basis of a sub-quantity the original data cannot be identified and therefore are also undetectable by third parties on the transmission path between data processing device and back-up servers. It is also possible for each of the sub-quantities then to be stored multiply, for example in duplicate, on different back-up servers spatially remote from one another, thus providing data redundancy. Furthermore, if desired, only particularly security-critical parts of the data to be backed-up can be transmitted in data streams complementary to one another, while non-critical data are not divided into different sub-quantities and thus not distributed between different back-up servers.

To increase the user comfort, data to be backed-up also from different sources within the storage means of the data processing device, for example data from different hard discs and/or hard disc partitions, are sent to the back-up servers. For further data protection, prior to their transmission to the back-up servers, these data then can also be combined to form a mixed data stream, from which the different data streams to be sent to the back-up servers are then formed.

Additional protection from unauthorised access by third parties to the data to be backed-up is achieved if the forementioned mixed data stream and/or the data streams to be transmitted to the relevant back-up servers are encrypted.

In a variant of the invention, the data to be backed-up are transmitted in at least three data streams to at least three different back-up servers spatially remote from one another. Here the data streams are in each case redundant, such that in each case two of the data streams are sufficient to regenerate the originally backed-up data. The breakdown of one back-up server is therefore non-problematic. However, it is not possible to recover the original data on the basis of only one data stream, thereby minimising the risk of unauthorised access by third parties to the backed-up data. In a preferred variant of the invention, the data to be backed-up are transmitted in five data streams to five different back-up servers spatially remote from one another; in this case although only four data streams are required for the regeneration of the backed-up data, less than four data streams are insufficient for this purpose.

BRIEF DESCRIPTION OF THE DRAWINGS

In the following the invention will be explained in the form of exemplary embodiments making reference to the Figures in which.

DETAILED DESCRIPTION OF THE INVENTION

Figure 1:
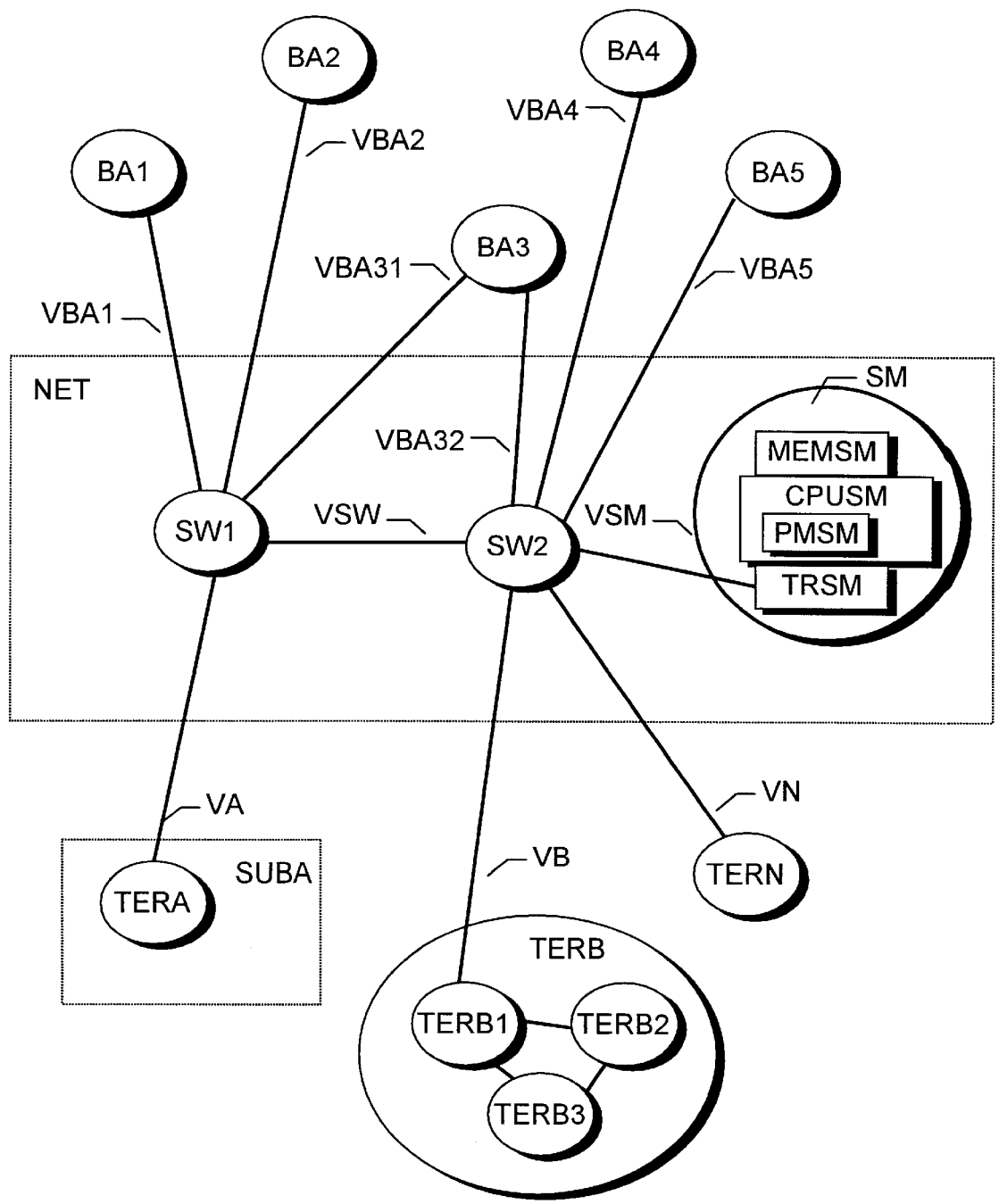
FIG. 1 is a schematic illustration of an arrangement for the implementation of the invention comprising a telecommunications network NET, a service provision server SM, back-up servers BA1 to BA5 according to the invention, and data processing devices TERA, TERB and TERN according to the invention.

FIG. 1 illustrates an example of an arrangement with which the invention can be implemented. FIG. 1 shows a telecommunications network NET, indicated by a dotted-line box, substantially comprising two nodes SW1 and SW2 and a service provision server SM. The service provision server SM will be referred to in the following as service server SM. The telecommunications network NET is a network via which data can be transmitted. The telecommunications network NET can consist for example of a telephone network, a broadband network, the internet or any combination of different networks suitable for data transmission. In the example according to FIG. 1, the nodes SW1 and SW2 are subscriber exchanges connected to one another via a broadband link VSW. By way of example of other data processing devices which have not been shown, a data processing device TERA of a subscriber SUBA is connected to the node SW1 via a subscriber connection line VA. The data processing device TERA consists for example of a personal computer or a combined terminal for internet access on the one hand and for telephony on the other hand. The node SW2 is connected via a subscriber connection line VB to a data processing device TERB and via a subscriber connection line VN to a data processing device TERN. Further data processing devices can also be connected to the node SW2. The data processing device TERB is a local network, a so-called LAN (local area network), comprising the computers TERB1, TERB2 and TERB3. In addition to the nodes SW1 and SW2, the telecommunications network NET also comprises further connection lines, nodes, routers, so-called cross-connects (=nodes of a transmission network) and the like, which have not been shown.

Figure 2:
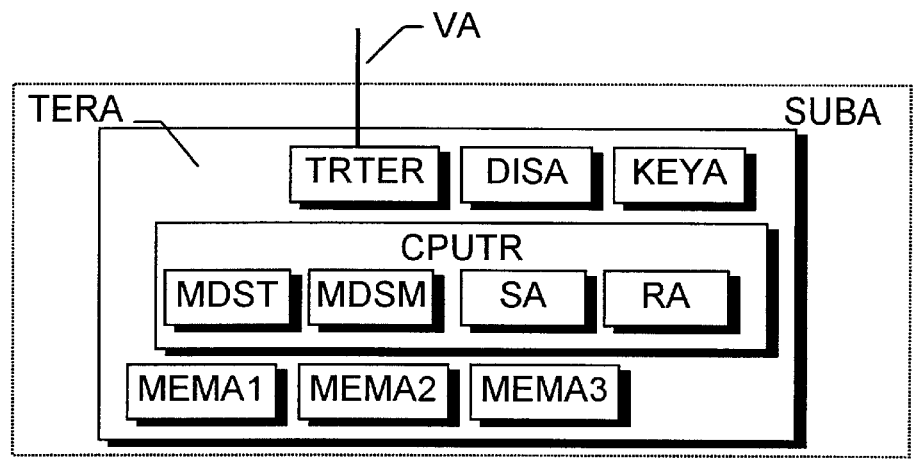
FIG. 2 is a schematic illustration of the data processing device TERA.

The data processing device TERA will be explained in detail in the following making reference to FIG. 2. The data processing device TERA is preferably a personal computer equipped for connection to the internet or another broadband network, but can also consist for example of a mobile telephone or fixed network telephone suitable for internet communication. The data processing device TERA comprises a connection means TRTER consisting for example of a modem, an ISDN adapter (ISDN=integrated services digital network), a DSL adapter (DSL=digital subscriber line) or another interface adapter for connection to the telecommunications network NET. Via the connection means TRTER, the data processing device TERA can establish a connection via the subscriber connection line VA to the telecommunications network NET. The data processing device TERA also comprises a control means CPUTR and storage means MEMA1, MEMA2 and MEMA3. The control means CPUTR consists for example of a processor with which program code stored in the storage means MEMA1, MEMA2 and MEMA3 can be executed. The storage means MEMA1, MEMA2 and MEMA3 comprise for example a hard disc, RAM modules (RAM=random access memory) or so-called flash-ROM modules (ROM=read only memory). It is also possible for the storage means MEMA1 and MEMA2 in each case to consist of partitions of one hard disc, while the storage means MEMA3 represents a further hard disc. The data processing device TERA also comprises a display means DISA and an input means KEYA. The display means DISA consists for example of a computer monitor or LCD display (liquid crystal display), while the input means KEYA is a keyboard or computer mouse. Other components of the data processing device TERA, for example internal links or a microphone and loudspeaker for the input and output of speech, have not been shown in FIG. 2 for reasons of clarity.

The node SW1 is connected via a connection CPUBA1 to a back-up server BA1, via a connection VBA2 to a back-up server BA2, and via a connection VBA31 to a back-up server BA3. Back-up servers BA3, BA4 and BA5 are connected to the node SW2 via connections VBA32, VBA4 and VBA5 respectively. The back-up servers BA1 to BA5 store back-up data originating from storage means of the data processing devices TERA, TERB and TERN and from other data processing devices which have not been shown. The back-up servers BA1 to BA5 can each consist of individual computers or also networks of a plurality of computers. The back-up servers BA1 to BA5 are in each case spatially separate from one another and are preferably arranged in a "secure" environment, for example a military bunker or the like. This ensures that any environmental influences which might damage the relevant back-up servers BA1 to BA5 as far as possible would affect only one of the back-up servers, while the data of the other back-up servers would not be destroyed or damaged. The back-up servers BA1 to BA5 consist for example of workstations or networks of personal computers, each equipped with large-capacity storage means, for example terabyte hard disc arrangements. Preferably, the back-up servers BA1 to BA5 are each designed to be particularly fail-safe, for example in that their components are duplicated. The back-up servers BA1 to BA5 can also be assigned to the telecommunications network NET. Additionally, the back-up servers BA1 to BA5 can also be networked with one another.

Figure 3:
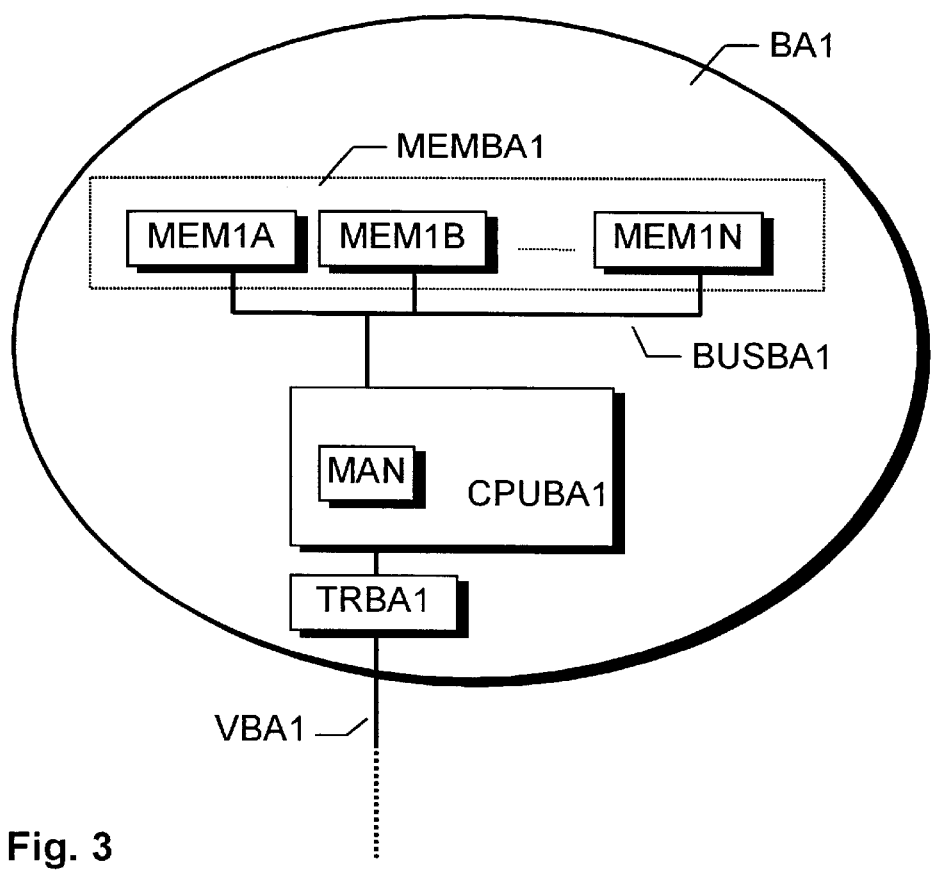
FIG. 3 is a schematic illustration of the service provision server SM.

The construction of the back-up server BA1 is schematically illustrated in FIG. 3 which shows only those components essential to the invention. The back-up server BA1 comprises a connection means TRBA1 via which the back-up server BA1 can establish the connection VBA1 and other connections (not shown) to the telecommunications network NET. The connection means TRBA1 consists for example of an interface card. The back-up server BA1 can receive and transmit large quantities of data via the connection means TRBA1. The connection means TRBA1, and the data streams transmitted and received with the aid thereof, are controlled by the back-up server BA1 via a control means CPUBA1 consisting for example of a processor or a cluster of processors. The basic functions of the back-up server BA1 are controlled by an operating system, for example a Unix operating system, the program code of which is stored in storage means MEMBA1 and the command sequences of which are executed by the control means CPUBA1. The storage means MEMBA1 also store one or more program modules whose command sequences are executed by the control means CPUBA1. A program module of this kind is for example the program module MAN which manages the storage means MEMBA1 and sets up memory sections MEM1A, MEM1B and MEM1N assigned to the data processing devices TERA, TERB and TERN respectively. The program module MAN also ensures that in each case only the associated data processing devices gain access to their assigned memory sections and that third parties are denied unauthorised access. The storage means MEMBA1 comprises for example large storage discs, DVD drives (DVD=digital versatile discs) or CD-ROM drives, which are connected to one another and to the control means CPUBA1 via a bus BA1.

For the back-up of data stored in the data processing device TERA, the data in the storage means MEMA1, MEMA2 and MEMA3 which are to be backed-up are firstly determined. For this purpose, the control means CPUTR executes a program module MDST which provides the subscriber SUBA with a user interface via which the subscriber SUBA can define which data are to be backed-up. The program module MDST then establishes the connection VA-VBA1 to the back-up server BA1 and logs-on to said server via a log-on procedure executed by the program module MAN. Then the program module MDST transmits the data which are to be backed-up to the back-up server BA1 which stores the data in the memory section MEM1A. The program module MDST then establishes a connection VA-VBA2 to the back-up server BA2 and transmits the data to be backed-up in a second data stream to the back-up server BA2. It is also possible for the program module MDST to maintain the connections VA-VBA1 and VA-VBA2 simultaneously and to transmit the data to be backed-up alternately packet-wise to the back-up servers BA1 and BA2 respectively.

The above described data back-up procedure can also be controlled by the service server SM. The service server SM consists for example of a personal computer or workstation comprising connection means TRSM, a control means CPUSM and a storage means MEMSM connected to one another by connections which have not been shown. The control means CPUSM is a processor or a cluster or processors and executes command sequences of program modules stored in the storage means MEMSM. The basic functions of the service server SM are controlled by an operating system, for example a Unix operating system. The connection means TRSM consists for example of an interface card. The service server SM can also form part of a so-called intelligent network in which case it can for example execute so-called service control functions. The service server SM can also represent an example of a network of service servers which are assigned to the telecommunications network NET or are contained therein and which also perform other services in addition to the data back-up service according to the invention to be described in the following. A possible platform for the data back-up service is for example the so-called Telecommunications Information Networking Architecture (=TINA).

If the subscriber SUBA wishes to back-up the data of the data processing device TERA with the aid of the service server SM, a program module MDSM firstly establishes a connection VA from the data processing device TERA to the node SW1 and sends the address of the service server SM to the node SW1. The node SW1 then establishes the further connection VSW-VSM to the service server. However, it is also possible for the connection VA-VSW-VSM between the data processing device TERA and the service server SM to be established in known manner with the aid of an internet browser, for example Netscape Navigator or Microsoft Internet Explorer, run by the control means CPUTR as program module. The subscriber SUBA then provides the internet browser with the address of the service server SM. In the service server SM a program module PMSM controls the communication, to be described in the following, with the data processing device TERA relating to a data back-up.

The data processing device TERA and the service server SM can exchange data with the aid of the internet browser or also the program module MDSM. The service server now sends data to the data processing device TERA to form a user interface, so that the subscriber SUBA can order and configure the data back-up services which he requires from the service server SM. The subscriber SUBA then indicates for example that the data of the storage means MEMA1 and MEMA3 are to be backed-up, that the data are to be stored on the back-up servers BA1, BA2, BA4 and BA5, and that the data to be backed-up are to be transmitted in encrypted form. The subscriber SUBA can also indicate whether he wishes his data to be backed-up with a specific operator of a back-up server and/or the price he is prepared to pay for the data back-up. It is also possible that, in the course of the communication with the data processing device TERA, the service server SM will load a program module to be executed by the data processing device TERA, for example a so-called Java Applet, into the data processing device TERA. The Java Applet is then executed as a program module by the data processing device TERA and for example makes available the forementioned user interface. This program module can also execute the data back-up procedure described in the following either alone or in interaction with the service server SM.

In accordance with the specifications of the subscriber SUBA, the service server SM instructs the program module MDSM in the data processing device TERA to send the data of the storage means MEMA1 via the connection VA to the node SW1. The node SW1 is instructed by the service server SM to forward the data which has been received from the data processing device TERA to the back-up server BA2 via the connection VBA2. The node SW1 also receives the instruction to create a copy of the data and forward this via the connection VSW1 to the node SW2. In accordance with an instruction of the service server SM, the node SW2 sends the data received from the node SW1 via the connection VBA4 to the back-up server BA4, and as a copy via the connection VBA5 to the back-up server BA5. The data processing device TERA then receives a command from the service server SM to send the data stored in the storage means MEMA3 to the node SW1. The node SW1 forwards the data via the connection VBA1 to the back-up server BA1 and as a copy via the connection VSW to the node SW2. The node SW2 forwards the data which it has just received on the one hand via the connection VBA32 to the back-up server BA3 and on the other hand as a copy via the connection VBA5 to the back-up server BA5. This ensures that the data of the data processing device TERA are stored at different locations spatially remote from one another and that the destruction of one of the back-up servers BA1 to BA5 does not lead to a loss of the data of the data processing device TERA which have been backed-up in this way.

Figure 4:
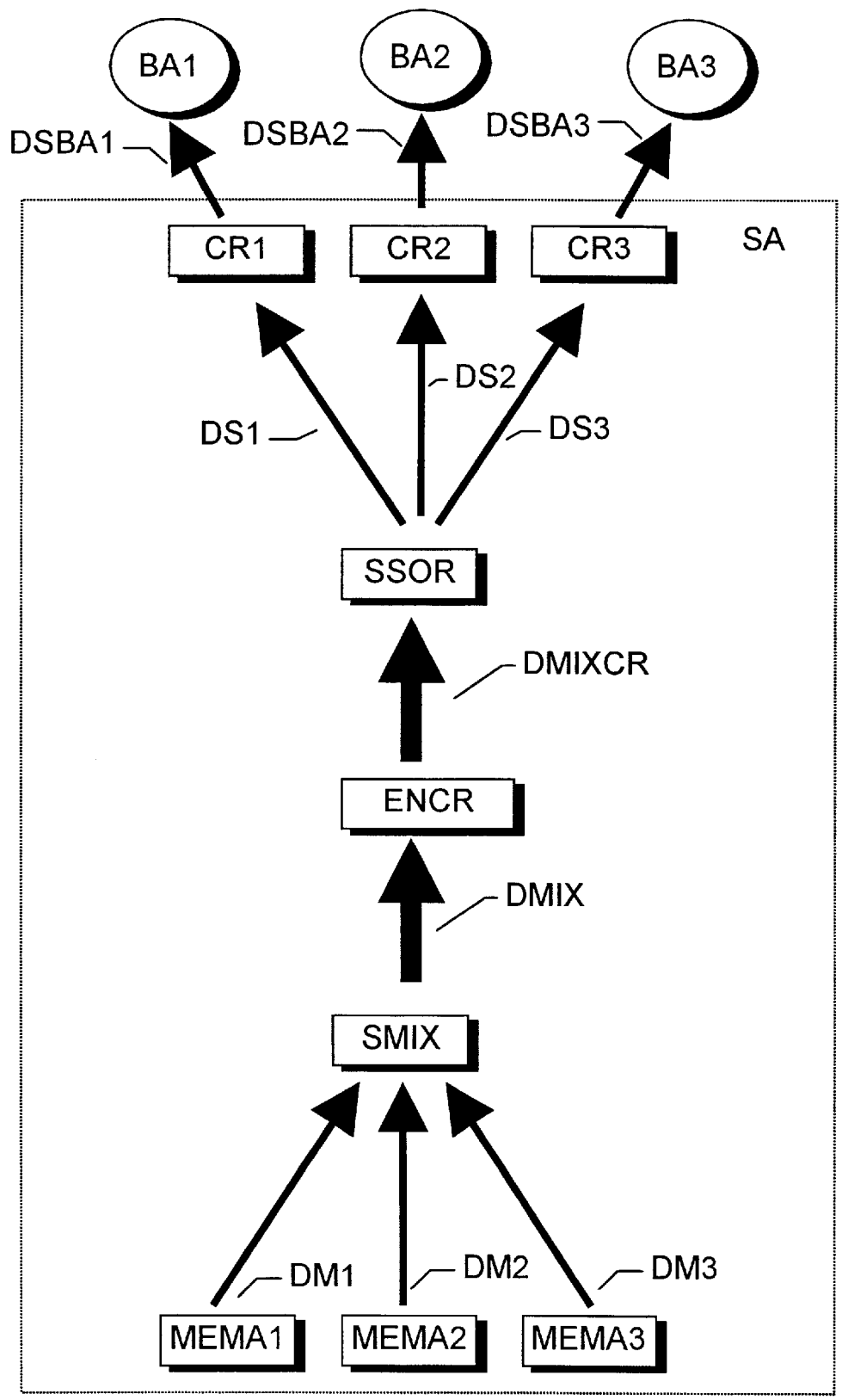
FIG. 4 illustrates a functional flow of a data back-up by a program module SA according to the invention and FIG. 5 illustrates a functional flow of a data regeneration by a program module RA according to the invention.

A variant of the invention which goes further in terms of privacy and data redundancy will be explained in the following making reference to FIG. 4. FIG. 4 illustrates a highly schematized example of a data flow within a program module SA which is executed by the control means CPURTR and backs-up data of the data processing device TERA. The program module SA is indicated by a broken-line box. The program module SA can for example be a Java Applet which is loaded by the service server SM into the data processing device TERA. The program module SA determines the data which are to be backed-up, for example with the aid of an already created configuration file or in accordance with the specifications of the subscriber SUBA. Then the program module SA alternately calls up the data to be backed-up stored on the storage means MEMA1, MEMA2 and MEMA3. A mixing module SMIX of the program module SA now calls up the data of the storage means MEMA1 which are sent in a data stream DM1 to the mixing module SMIX. The mixing module SMIX also receives the data from the storage means MEMA2 in a data stream DM2 and the data from the storage means MEMA3 in a data stream DM3. The mixing module SMIX mixes the data streams DM1, DM2 and DM3. The mixing module attaches identifiers to the data of the relevant data streams DM1, DM2 and DM3 in accordance with a predetermined algorithm, which identifiers render the data clearly assignable to the storage means MEMA1, MEMA2 and MEMA3. The data mixed and identified in this way are transferred by the mixing module SMIX in a mixed data stream DMIX to an encryption module ENCR. The encryption module ENCR encrypts the data of the data stream DMIX in accordance with a predetermined algorithm and sends said data as encrypted data stream DMIXCR to a distributing module SSOR. The distributing module SSOR divides the data stream DMIXCR into three separate data streams DS1, DS2 and DS3 and sends these data streams to respective encryption modules CR1, CR2 and CR3. These encrypt the received data of the data streams DS1, DS2 and DS3 with the aid of a predetermined algorithm. The data encrypted by the encryption module CR1 are then transmitted as data stream DSBA1 to the back-up server BA1, while the data encrypted by the encryption module CR2 are transmitted to the back-up server BA2. The encryption module CR3 transmits the data which it has encrypted as data stream DSBA3 to the back-up server BA3.

Preferably, the data streams DS1, DS2 and DS3 are formed by the distributing module such that in each case two of the data streams DS1, DS2 and DS3 are sufficient to regenerate the backed-up data from the storage means MEMA1, MEMA2 and MEMA3. If, as a result of some defect, one of the back-up servers BA1, BA2 or BA3 then is no longer able to send back the data backed-up therein, the backed-up data can still be regenerated with the aid of the data sent back to the data processing device TERA from the correctly operating back-up servers.

The mixing of data from different sources, the subsequent encryption, the division into partially redundant data streams and the additional further encryption of these divided data streams ensure both a high degree of data redundancy and also a high degree of privacy. A third party can regenerate the backed-up data only if he has access to at least two of the data streams DSBA1, DSBA2 or DSBA3. Furthermore, the storage on back-up servers spatially remote from one another and from the relevant data processing device ensures that a regeneration of the backed-up data is possible even in the event of the breakdown or destruction of one of the back-up servers.

In addition to the described method of forming three data streams and sending these to three back-up servers spatially remote from one another, it is also possible to divide the mixed data stream DMIXCR into further data streams which are in each case partially redundant, and then to transmit each of these data streams to separate back-up servers. The data streams DSBA1, DSBA2 and DSBA3 can for example also each be sent to two back-up servers spatially remote from one another. Additional redundancy is achieved in this way.

In a preferred variant, five data streams are formed and transmitted to back-up servers spatially remote from one another. It is then necessary and sufficient for four of said data streams to be sent back from the relevant back-up servers for the regeneration of the original data.

Furthermore, the service server SM and/or the data processing device TERA can instruct the telecommunications network NET to transmit each of the data streams DSBA1, DSBA2 and DSBA3 on different communications paths of the telecommunications network NET, so that a third party cannot access these data streams simply by monitoring a connection line of the telecommunications network NET. For example, the data stream DSBA3 can be sent to the back-up server BA3 both via the connection VBA31 and via the connection VBA3.

Figure 5:
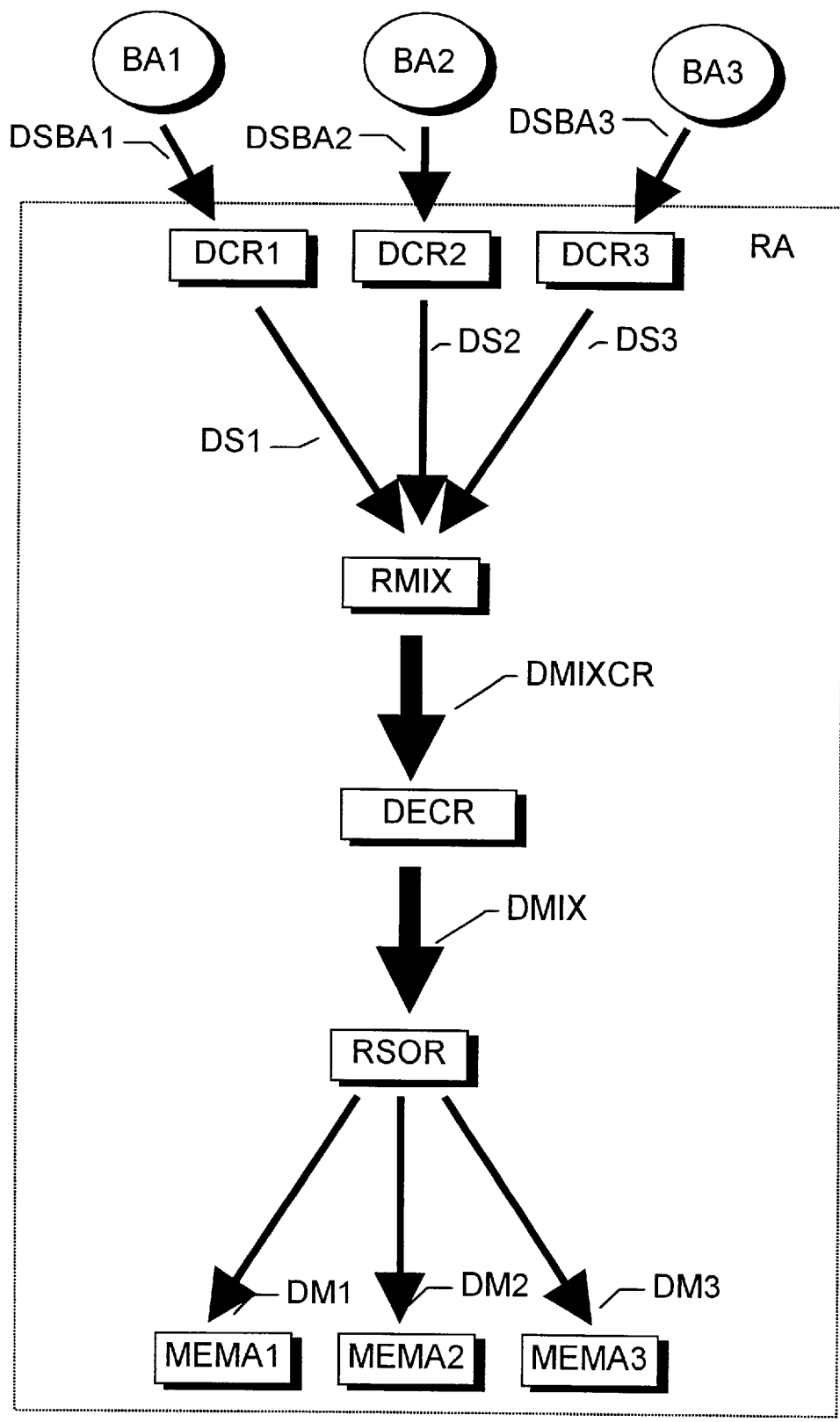

The regeneration of the data backed-up on the back-up servers BA1, BA2 and BA3 in accordance with the process illustrated in FIG. 4 will be explained in the following with reference to FIG. 5. Here a program module RA provided in the data processing device TERA for the data regeneration sends instructions to the back-up servers BA1, BA2 and BA3 which send back the data backed-up therein to the data processing device TERA. However, it is also possible for the subscriber SUBA to instruct the service server SM to regenerate the data using the forementioned internet browser. The service server SM then sends the above described instructions to the back-up servers BA1, BA2 and BA3 and performs the further data regeneration described in the following. The program module RA and the service server SM can also cooperate interactively in the data regeneration.

In response to the relevant instructions, the data processing device TERA is sent the data stream DSBA1 from the back-up server BA1, the data stream DSBA2 from the back-up server BA2 and the data stream DSBA3 from the back-up server BA3. The data processing device TERA receives the data streams via the connection means TRTER. A decryption module DCR1 decrypts the data stream DSBA1, a decryption module DCR2 decrypts the data stream DSBA2 and a decryption module DCR3 decrypts the data stream DSBA3. Here the encryption algorithm employed by the encryption modules CR1 to CR3 in FIG. 4 is applied in inverse form and decrypted data streams DS1, DS2 and DS3 are formed from the encrypted data streams DSBA1, DSBA2 and DSBA3 respectively and sent to a mixing module RMIX. The mixing module RMIX applies the distribution algorithm used by the distributing module SSOR in FIG. 3 in inverse form and mixes the data streams DS1 to DS3 to form a mixed data stream DMIXCR. The mixed data stream DMIXCR is decrypted by a decryption module DECR which executes the algorithm of the encryption module ENCR in FIG. 4 in inverse form. From the decryption module DECR, the now decrypted but still packed data are sent as data stream DMIX to a distributing module RSOR which divides the data stream DMIX into data streams DM1, DM2 and DM3. The distributing module RSOR applies the inverse algorithm of the mixing module SMIX according to FIG. 4. The data stream DM1 is re-input into the storage means MEMA1, the data stream DM2 into the storage means MEMA2 and the data stream DM3 into the storage means MEMA3, so that the original data are fully regenerated again.

In the event of less stringent demands in terms of the protection from unauthorised access by third parties to the backed-up data, it is also possible to perform no encryption or to provide only the encryption stage/decryption stage EMCR/DECR and/or the encryption stage/decryption stage CR1–CR3/DCR1–DCR3. Additionally, it is also possible to provide only the encryption modules CR1 and CR2 and the decryption modules DCR1 and DCR2 but not the decryption module CR3 and the decryption module DCR3.

The data back-up procedures according to the invention can be implemented by the data processing device TERA and/or the service server SM according to circumstances, for example when relatively large configuration changes are to be take place in the data processing device TERA. However it is also possible for a program module which implements a data back-up cyclically or in the event of substantial data changes in the data processing device TERA to be installed in the data processing device TERA. The service server SM can also cyclically request the data processing device TERA to perform a data back-up.

In the data processing device TERB, the computer TERB1 is responsible for the data back-up. If data of the data processing device TERB are to be backed-up, the computer TERB1 calls up the data to be backed-up both from its own storage means and from the computers TERB2 and TERB3. The computer TERB1 sends the relevant data to be backed-up to the back-up servers BA1 to BA5 in accordance with the above described methods. Here the computer TERB1 can for example also mix, encrypt and redivide data streams as described with reference to FIG. 4.

For the backing-up of the data of the data processing device TERA on the relevant back-up servers BA1 to BA5, the service server SM and the back-up servers BA1 to BA5 can in each case calculate charges and send these for example in charge telegrams to a charge computer (not shown) of the telecommunications network NET. On the basis of the charge data of the charge computer, a bill is then created for the subscriber SUBA. The service server SM can for example calculate charges for the control of the data back-up and the back-up servers BA1 to BA5 can calculate charges for the storage of the data.

What is claimed is:

1. A process for backing-up data stored on storage means of a data processing device comprising:
    determination of data in the storage means which are to be backed-up;
    establishment of a plurality of connections via a telecommunications network between the data processing device and each of a plurality of backup servers; and
    transmission of respective data streams, formed from the data to be backed-up, from the data processing device to different ones of the plurality of back-up servers;
    wherein the data streams are formed to be redundant only in part, such that the data to be backed up cannot be regenerated by only one of the data streams, but can be regenerated by combining fewer than all of the data streams.

2. A process according to claim 1, wherein at least one of the data streams is encrypted.

3. A process according to claim 1, wherein a connection is established from the data processing device to a service provision server assigned to the telecommunications network, and that with the aid of the service provision server, the connections between the data processing device and the back-up servers are in each case established via the telecommunications network.

4. A process according to claim 3, wherein charges are calculated for the backing-up of the data.

5. A process according to claim 1, further comprising:
    transmission of a first one of the data streams, formed from the data to be backed-up, from a first one of the plurality of back-up servers to the data processing device;
    transmission of a second one of the data streams, formed from the data to be backed-up, from a second one of the plurality of backup servers to the data processing device; and
    input of the first and second data streams in the storage means of the data processing device.

6. A process according to claim 1, wherein a time control program module executed by the data processing device starts the steps of the process for backing-up data stored on storage means.

7. A process for backing-up data stored on storage means of a data processing device comprising:
    determination of data in the storage means which are to be backed-up,
    establishment of a first connection via a telecommunications network between the data processing device and a first back-up server spatially remote from the data processing device,
    transmission of a first data stream, formed from the data to be backed-up, from the data processing device to the first back-up server,
    establishment of at least one second connection via the telecommunications network between the data processing device and at least one second back-up server spatially remote from the data processing device, and
    transmission of at least one second data stream, formed from the data to be backed-up, from the data processing device to the at least one second back-up server;
    wherein the data to be backed-up from different sources of the storage means are combined to form a mixed data stream, and that the first and the at least one second data stream are formed from the mixed data stream and transmitted to the first and the at least one second back-up server respectively wherein, for a regeneration of the data backed-up in this way, the first and the at least one second data stream are loaded from the first and the at least one second back-up server into the data processing device, are combined to form a mixed data stream, and the data of the mixed data stream are divided between the different sources in the storage means.

8. A process according to claim 7, wherein the mixed data stream is encrypted.

9. A process for backing-up data stored on storage means of a data processing device comprising:
    determination of data in the storage means which are to be backed-up,
    establishment of a first connection via a telecommunications network between the data processing device and a first back-up server spatially remote from the data processing device,
    transmission of a first data stream, formed from the data to be backed-up, from the data processing device to the first back-up server,
    establishment of at least one second connection via the telecommunications network between the data processing device and at least one second back-up server spatially remote from the data processing device and spatially remote from the first back-up server, and
    transmission of at least one second data stream, formed from the data to be backed-up, from the data processing device to the at least one second back-up server;
    wherein at least one third connection is established via the telecommunications network between the data processing device and at least one third back-up server spatially remote from the data processing device, and that at least one third data stream, formed from the data to be backed-up, is transmitted to the at least one third back-up server, where the first, the second and the at least one third data stream are formed to be redundant only in part, such that the data to be backed-up cannot be regenerated by only one of the data streams, but can be regenerated by combining the first and the second data streams, or the first and the at least one third data streams, or the second and the at least one third data streams.

10. A data processing device for backing-up data comprising:
    storage means with stored data;

recognition means for determining data in the storage means which are to be backed-up;

connection means for establishing a plurality of connections via a telecommunications network between the data processing device and each of a plurality of backup servers; and transmitting means for transmitting respective data streams, formed from the data to be backed-up, from the data processing device to different ones of the plurality of back-up servers;

wherein the data streams are formed to be redundant only in part, such that the data to be backed up cannot be regenerated by only one of the data streams, but can be regenerated by combining fewer than all of the data streams.

11. A program module for a data processing device for backing-up data stored on storage means of the data processing device, the program module comprising program code which can be executed by control means of the data processing device, the program module comprising:

recognition means for determining data in the storage means which are to be backed-up;

connection means for establishing a plurality of connections via a telecommunications network between the data processing device and each of a plurality of backup servers; and transmitting means for transmitting respective data streams, formed from the data to be backed-up, from the data processing device to different ones of the plurality of back-up servers;

wherein the data streams are formed to be redundant only in part, such that the data to be backed up cannot be regenerated by only one of the data streams, but can be regenerated by combining fewer than all of the data streams.

12. A computer readable medium, with a program module according to claim 11.

13. A service provision server for providing a service for backing-up data stored on storage means of a data processing device, comprising:

connection control means for establishing a connection to the data processing device, and establishing a plurality of connections via a telecommunications network between the data processing device and each of a plurality of backup servers; and transmission control means for transmitting respective data streams, formed from the data to be backed-up, from the data processing device to different ones of the plurality of back-up servers;

wherein the data streams are formed to be redundant only in part, such that the data to be backed up cannot be regenerated by only one of the data streams, but can be regenerated by combining fewer than all of the data streams.

14. A service provision server according to claim 13, further comprising:

loading means for loading a service program module, executable by the data processing device, onto the data processing device, and communications means for providing the back-up service in interaction with the service program module.

15. A program module, for a service provision server for backing-up data stored on storage means of a data processing device, containing program code executable by control means of the service provision server, the program module comprising:

connection means for establishing a connection to the data processing device;

connection control means for establishing a plurality of connections via a telecommunications network between the data processing device and each of a plurality of backup servers; and transmission control means for transmitting respective data streams, formed from the data to be backed-up, from the data processing device to different ones of the plurality of back-up servers;

wherein the data streams are formed to be redundant only in part, such that the data to be backed up cannot be regenerated by only one of the data streams, but can be regenerated by combining fewer than all of the data streams.

16. A storage means, in particular a computer readable medium, with a program module according to claim 15.

17. A system, for backing-up data stored on storage means of a data processing device, comprising:

a data processing device having storage means with data to be backed up, a service provision server, a first back-up server spatially remote from the data processing device, and a second back-up server spatially remote from the data processing device and spatially remote from the first back-up server;

the service provision server establishing a connection to the data processing device, and establishing a first connection via a telecommunications network between the data processing device and the first back-up server;

a first data stream, formed from the data to be backed-up, being communicated from the data processing device to the first back-up server;

the service provision server establishing a second connection via the telecommunications network between the data processing device and the second back-up server; and a second data stream, formed from the data to be backed-up, being communicated from the data processing device to the second back-up server via the telecommunications network, wherein the data streams are formed to be redundant only in part, such that the data to be backed up cannot be regenerated by only one of the data streams, and can be regenerated by combining fewer than all of the data streams.

18. A data backup module configured to transmit data streams to back-up data stored in a storage area of a data processor system, said data backup module comprising: p1 a data recognizer configured to determine the data to be backed up stored in the storage area; and p1 a data transmitter configured to form a plurality of data streams from the data determined by the recognizer, and to transmit a data stream of the plurality of data streams to each backup server of the plurality of backup servers, each data stream being partially redundant, such that the determined data can be regenerated based on a combination of fewer than all of the data streams of the plurality of data streams and cannot be regenerated based on only one data stream of the plurality of data streams.

19. The data backup module of claim 18, wherein the module is a module of a service provision server physically separate from the data processor system, and connected to the data processor system via a telecommunications network.

20. The data backup module of claim 18, wherein the module is a module of the data processor system.

21. The data backup module of claim 18, wherein each backup server of the plurality of backup servers is geographically remote from every other backup server of the plurality of backup servers and from the data processor system, and is connected to the data processor system via a telecommunications network.

* * * * *